United States Patent [19]

Yagishita

[11] Patent Number: 5,593,626

[45] Date of Patent: Jan. 14, 1997

[54] METHOD OF FABRICATING MOLDED FILTER ELEMENT

[76] Inventor: Aisaburo Yagishita, 4-5-2 Shinpocho, Chikusa-ku, Nagoya-shi, Aichi, 464, Japan

[21] Appl. No.: 228,623

[22] Filed: Apr. 18, 1994

[51] Int. Cl.$^6$ .................................................. B29C 39/02
[52] U.S. Cl. .................. 264/122; 264/125; 264/DIG. 48; 210/510.1
[58] Field of Search .............................. 264/23, 109, 115, 264/117, 119, 122, 124, 125, DIG. 44, DIG. 48; 210/502.1, 510.1, 691; 249/63

[56] References Cited

U.S. PATENT DOCUMENTS

| | | | |
|---|---|---|---|
| 3,919,369 | 11/1975 | Holden | 264/112 |
| 4,000,236 | 12/1976 | Redfarn et al. | 264/122 X |
| 4,061,807 | 12/1977 | Shaler et al. | 210/502.1 X |
| 4,569,756 | 2/1986 | Klein | 210/502.1 X |
| 4,664,683 | 5/1987 | Degen et al. | 264/122 X |
| 4,753,728 | 6/1988 | Vanderbilt et al. | 210/282 |
| 4,771,981 | 9/1988 | Little et al. | 249/63 X |
| 5,091,080 | 2/1992 | van Eikeren et al. | 210/502.1 X |

FOREIGN PATENT DOCUMENTS

| | | |
|---|---|---|
| 497594A1 | 8/1992 | European Pat. Off. . |
| 55-13160 | 1/1980 | Japan . |
| 60-91216 | 6/1985 | Japan . |
| 1-47446 | 2/1989 | Japan . |
| 1571924 | 7/1980 | United Kingdom . |

*Primary Examiner*—Robert A. Dawson
*Assistant Examiner*—Kenneth M. Jones
*Attorney, Agent, or Firm*—Lowe, Price, LeBlanc & Becker

[57] ABSTRACT

A molded filter element is fabricated by the method comprising the steps of: preparing a plastic composition of a powder-grain adsorbent of 100 weight parts, an emulsion type synthetic resin binder of 5–20 weight parts having a film-making capability at room temperature, an aqueous high-polymer binder of 0.5–5 weight part, and water of the amount sufficient to change the compound of these agents into a composition having its own shape holding property; pressure-filling said plastic composition in a mold composed of plural members to provide a molded filter element; evaporating water until the molded filter element has a shape-holding strength in a state where at least one member of said mold is removed; and heat-treating the molded filter element at a temperature of 110°–160° C. Thus, the molded filter element permits filtering and adsorption/removal of impurities to be performed simultaneously, and can have a large breaking strength, uniform openings, a small flow resistance and a large adsorption capacity.

7 Claims, No Drawings

METHOD OF FABRICATING MOLDED FILTER ELEMENT

BACKGROUND OF THE INVENTION

1. Field of the Invention

The present invention relates to a method of fabricating a cartridge type filter for adsorbing and removing the component solved in water or aqueous solution to be purified, and more particularly to a molded filter element having two kinds of functions of filtering and adsorption.

2. Description of the Prior Art

In recent years, with an increase in used amount of water, deterioration of water quality has become problematic. In order to solve this problem, usually, the water has been filtered using a water purifier and a small amount of impurities contained in the water has been adsorbed and removed. In industrial use also, cleaning water of a high degree of purity has been required in many cases. The adsorbent in the water purifier used for water purification has been usually used as a cartridge type in which granular activated-carbon and/or zeolite are filled in container such as a tube-like case or sack.

However, the adsorption unit of the filling cartridge type is likely to have a non-uniform filling density so that it causes "channeling" during filtering, thus providing insufficient adsorption capability. As the case may be, the following accident is likely to occur. Namely, while the adsorbent is used, the purified water may be polluted by powder which flows out because of the collapse of the adsorbent.

In order to obviate such a defect, an adsorbent unit has been proposed in which nonwoven cloth of activated carbon fiber is wound around a porous hollow-cylinder. Although this adsorbent has advantages of uniform opening or space rate and adsorption force and less fluctuation, it has disadvantages of large bulk, small adsorption capacity per volume and high production cost.

In Japanese Utility Model Laid-open No. Sho 60-91216 (1985), a filter element has been also proposed, in which the inner and outer surfaces of a cylindrical porous adsorption material are covered with an adsorbent fiber layer and filter cloth (The cylindrical porous adsorption material can be made by thermally molding mixed adsorption particles and thermally-soluble fiber). Such a porous adsorption material, however, has disadvantages of complicated structure, difficult control of the opening rate and high production cost due to use of particular materials.

SUMMARY OF THE INVENTION

An object of the present invention is to provide a method of fabricating a molded filter element which can simultaneously perform filtering and adsorption/removal of impurities, and has a breaking strength, uniform opening or porosity, small flow (filteration) resistance and large adsorption capacity.

In order to attain the above object, there is provided a method of fabricating a molded filter element comprising the steps of uniformly mixing together water, a powder-grain absorbent of 100 parts by weight, an emulsion of synthetic resin binder of 5–20 parts by weight having a film-making capacity at room temperature and an aqueous polymer binder of 0.5–5 parts by weight, thereby forming a wet plastic composition, the amount of the water used being in excess of a quantity sufficient to provide the resulting composition a shape holding property; pressure-filling said plastic composition in a mold composed of plural members to provide a shaped filter element; evaporating said water from the plastic composition until said shaped element has a shape-holding strength in a state where at least one member of said mold is removed; and heat-treating the shaped filter element at a temperature of 100°–160° C. to form the molded filter element.

The powder-grain adsorbent used in the present invention may be optionally selected from one or more of activated carbon, zeolite, silica gel, pegmatite ("Bakuhanseki"), ion exchange resin, activated clay, diatomite, etc. The grain degree of such a powder-grain adsorbent may be e.g. in a range of 0.05–1.5 mm (powder) or 2.4–4.8 mm (grain). In order to give the molded element a desired opening rate, the powder-grain adsorbent having a suitable distribution of grain diameters can be selectively used.

The synthetic resin binder used in the present invention may be emulsion type synthetic resin having a film-making capability at room temperature. The aqueous emulsion type synthetic resin which can form a stiff continuous coating when dried is preferably used. Such synthetic resin may be thermo-plastic synthetic resin which can be obtained by polymerizing monomer such as acryl, vinyl, butadiene, styrene, olefin, etc. Among them, the synthetic resin of acryl family is preferably used. The used amount of the emulsion type synthetic resin of 5–20 weight parts is suitable for the powder-grain adsorbent of 100 weight parts. The amount of emulsion synthetic resin less than the weight parts is not practical because the breakdown strength of the molded element becomes small. On the other hand, the amount exceeding the above weight part is not desired since it does not improve the breaking strength so highly, but may impair the adsorption capacity of the adsorbent and requires high cost.

The aqueous high polymer binder used in the present invention may be cellulosic such as carboxymethylcellulose, hydroxyethylcellulose and methylcellulose; and polyvinyl alcohol. Among them, the cellulosic is preferably used. The used amount of the aqueous high polymer binder of 0.5–5 weight parts is suitable for the powder-grain adsorbent of 100 weight parts. The amount of the aqueous high-polymer binder less than the weight parts is not suitable because the resultant molded element becomes fragile and is likely to break. On the other hand, the amount exceeding the above weight parts is not desired since it does not improve the breaking strength or toughness so highly, but may impair the adsorption capacity of the adsorbent. So, the smaller degree of aqueous high-polymer binder within the above range is preferably used.

The above adsorbent is mixed with the binders dissolved or diluted in water to provide a wet plastic composition. The amount of used water can be preferably selected within a range where the composition when formed in a mass has its own shape holding property and does not give flowability. The suitable used amount of water, although it depends on the distribution of grain diameters in the powder-grain adsorbent, is usually 70–150 weight parts for the powder-grain adsorbent of 100 weight parts. A less used amount of water is likely to provide insufficient compression so that the molded element having uniform openings cannot be obtained. On the other hand, a much used amount of water provides uniform and relatively large openings in the molded element, but requires an excessively long time for drying.

In accordance with the present invention, the binders dissolved or dispersed in water and the adsorbent are mixed to provide the wet plastic composition. In this case, any device capable of uniformly mixing these agents may be used. The order and method of mixing should not also be limited particularly.

The plastic composition obtained by the above combination is filled in a mold assembled by plural members and pressed by a suitable method to provide a molded filter element. The mold may take any desired shape such as a cylinder, plate or pole. But, in order to fabricate the molded element having a precise shape, it is necessary to evaporate water at room temperature or under a heating state until the resultant mold has its own shape holding strength in a state where at least one member is removed from the mold pattern.

The molded element to which a predetermined shape holding strength has been given owing to preliminary drying, after pattern removal, is sufficiently dried at temperatures of 90° C. or lower for e.g. 12 hours or longer. After evaporation of water is stopped, the molded filer element is heat-treated at 110°–160° C. for one hour or more, preferably about two hours thereby to harden the binders. Thus, the molded filter element according to the present invention can be completed.

In accordance with the present invention, a molded filter element having relatively large breaking strength, small flow resistance and also large adsorption capacity can be obtained so that filtering of suspended particles and adsorption/removal of dissolved particles can be simultaneously performed.

In accordance with the present invention, a unit-type filter which has a breakdown strength, a small flow resistance, a large adsorption capacity, and is hard to deteriorate for long-time filtering can be fabricated at low cost. The filter element can be easily attached to or removed from a filtering machine.

The above and other objects and features of the present invention will be more apparent from the following description regarding several embodiments of the present invention.

DESCRIPTION OF THE PREFERRED EMBODIMENTS

Embodiment 1

A mixed solution in which acryl resin emulsion (available as "EXCELTACK" from Cemedyne Co. Ltd. and having a solid content of 70 weight %) of 14 weight parts and carboxymethylcellulose sodium acid (available as "KIKKORATE" from Nichirin Chemical Co. Ltd.) of 1 weight part are uniformly dissolved in water of 76 weight parts are gradually added to dried coconut shell activated carbon of 100 weight parts, which is crushed into 0.3–1.5 mm particles,. The composition thus obtained is sufficiently stirred to provide a plastic composition which is uniformly wet.

A stainless steel outer mold having an inner diameter of 55 mm and a stainless steel inner mold having an outer diameter of 35 mm were concentrically fixed on a stand. The above composition was filled between the outer mold and the inner pattern and beaten from above so that it is compressed. Thereafter, the inner mold was extracted and was left for drying as it was day and night. The element thus molded was extracted from the outer mold. It was dried day and night at temperatures of 60°–80° C. and heat-treated at a temperature of 140° C. for two hours. Thus, a cylindrical molded filter element A having an inner diameter of 34 mm, an outer diameter of 54 mm and a length of about 205 mm was provided according to the present invention.

The molded filter element A thus obtained had a weight of 152 g, an apparent specific gravity of 0.537, an apparent opening rate of 47% and a compression breakdown strength of 147N (Newton) in a radial direction during drying. After immersed in water for 48 hours, it had a compression breaking strength of 105N in the radial direction and a compression deforming rate of about 37%. The flow resistance when water is passed under pressure from the inner side of the cylinder to the outer side thereof is 10 kPa (Pascal) or less at a flowing speed of 10 m/hr at the outer surface.

When continuous water-passing filtering is carried out at the flowing speed of 10 m/hr was performed, leak of powder at an initial time and during running was not entirely found.

Comparison Example 1

For comparison, a molded filter element B was fabricated under the same condition as in Embodiment 1 except that the used amount of acryl resin emulsion (solid contents of 50 weight %) of 5 weight parts and the used amount of water of 50 weight parts were used. Its breaking strength during drying was about 30% of the molded filter element A.

Comparison Example 2

For comparison, a molded filter element C was fabricated under the same condition as in Embodiment 1 except that carboxymethylcellulose sodium acid was not used. Its breaking strength during drying was about 60% of the molded filter element C.

Comparison Examples 3 and 4

Molded filter elements D and E were fabricated under entirely the same condition as in Embodiment 1 except the heat-treating conditions after drying of 3 hours at 110° C. in Comparison Example 3 and 2 hours at 170° C. Their breaking strengths during drying were about 20% and about 35% of the molded filter element A, respectively.

Embodiment 2

A mixed solution in which acryl resin emulsion of 14 weight parts used in Embodiment 1 and carboxymethylcellulose sodium acid of 0.8 weight part in Embodiment 1 are uniformly dissolved in water of 70 weight parts is added to dried coconut shell activated carbon of 50 weight parts, which is crushed into 0.3–1.5 mm particles and pegmatite ("Bakuhannseki") of 50 weight parts which is also crushed into 0.3–1.5 mm particles. The composition thus obtained is sufficiently stirred and molded into a plastic composition as in Embodiment 1 to provide a molded filter F according to the present invention.

The molded filter element F thus obtained had a compression breaking strength of 196N in a radial direction during drying and a compression breaking strength of 105N in the radial direction after immersed in water for 48 hours. The flow resistance when water is passed under pressure from the inner side of the cylinder toward the outer side thereof is 10 kPa or less at a flowing speed of 10 m/hr at the outer surface.

Embodiment 3

A molded filter element G according to the present invention was fabricated under the same condition as in Embodiment 1 except that silica gel of 100 weight parts which is crushed into 0.18–0.33 mm particles was used in place of dried coconut shell activated carbon of 50 weight parts which is crushed into 0.3–1.5 mm particles.

The molded filter element G thus obtained had an apparent opening rate of 40%, a compression breaking strength of 176N in a radial direction during drying and a compression breakdown strength of 141N in the radial direction after immersed in water for 48 hours. The flow resistance when water is passed under pressure from the inner side of the cylinder to the outer side thereof is 10 kPa or less at a flowing speed of 10 m/hr at the outer surface.

Embodiment 4

Using dried coconut activated carbon crushed into 0.3–1.5 mm particles, as an outer mold, a molded filter element having an outer diameter of 72 mm, an inner diameter of 42.7 mm and a length of 250 mm was made in the same way as in Embodiment 1. A plastic composition combined in the same way as in Embodiment 1, except that the dried coconut crushed into 0.1–0.4 mm particles was used, was filled between the above outer mold and an internal mold of stainless steel having an outer diameter of 22 mm and pressed. The plastic composition is dried and heat-treated by the same way as in Embodiment 1 to provide a double-cylindrical type molded filter element H having an outer diameter of 72 mm, an internal diameter of 22 mm and a length of 250 mm according to the present invention.

Using the molded filter element H thus obtained, a factory effluent containing suspended solid (SS) of 50 mg/l composed of hydroxide of metal such as iron, chrome and zinc and chemical oxygen demand (COD) of 15 mg/l is passed for filtering from the exterior of a cylinder to the inner thereof so that the flowing speed on the molded filter element is 10 m/hr. The flow resistance after the filtering for 1.1 hours was increased from 9.8 kPa to 118 kPa, but the collected amount of SS per one piece of molded filter element H was 25.4 g and the adsorption amount of COD was 7.60 g.

I claim:

1. A method of fabricating a molded filter element comprising the steps of:

uniformly mixing together water, a powder-grain adsorbent of 100 parts by weight, an emulsion of synthetic resin binder of 5–20 parts by weight having a film-making capacity at room temperature and an aqueous polymer binder of 0.5–5 parts by weight, thereby forming a wet plastic composition, the amount of the water used being in excess of a quantity sufficient to provide the resulting composition a shape holding property;

pressure-filling said plastic composition in a mold composed of plural members to provide a shaped filter element;

evaporating said water from the plastic composition until said shaped element has a shape-holding strength in a state where at least one member of said mold is removed; and heat-treating the shaped filter element at a temperature of 100°–160° C. to form the molded filter element.

2. A method of fabricating a molded filter element according to claim 1, wherein the amount of water is 70–100 parts by weight for the powder-grain adsorbent of 100 parts by weight.

3. A method of fabricating a molded filter element according to claim 1, wherein the shaped filter element is heat-treated for 1–2 hours.

4. A method of fabricating a molded filter element according to claim 1, wherein said molded filter element has a hollow cylindrical shape.

5. A method of fabricating a molded filter element according to claim 1, wherein said powder-grain adsorbent is selected from the group consisting of activated carbon, zeolite, silica gel, pegmatite ("Bakuhannseki"), ion exchange resin, activated clay, diatomite, and the powder-grain mixture thereof.

6. A method of fabricating a molded filter element according to claim 1, wherein said synthetic resin binder is made of thermoplastic synthetic resin.

7. A method of fabricating a molded filter material according to claim 1, wherein said aqueous high-polymer binder is selected from the group consisting of cellulosic binders, polyvinyl alcohol, and polyacrylic acid.

* * * * *